Figure 1:
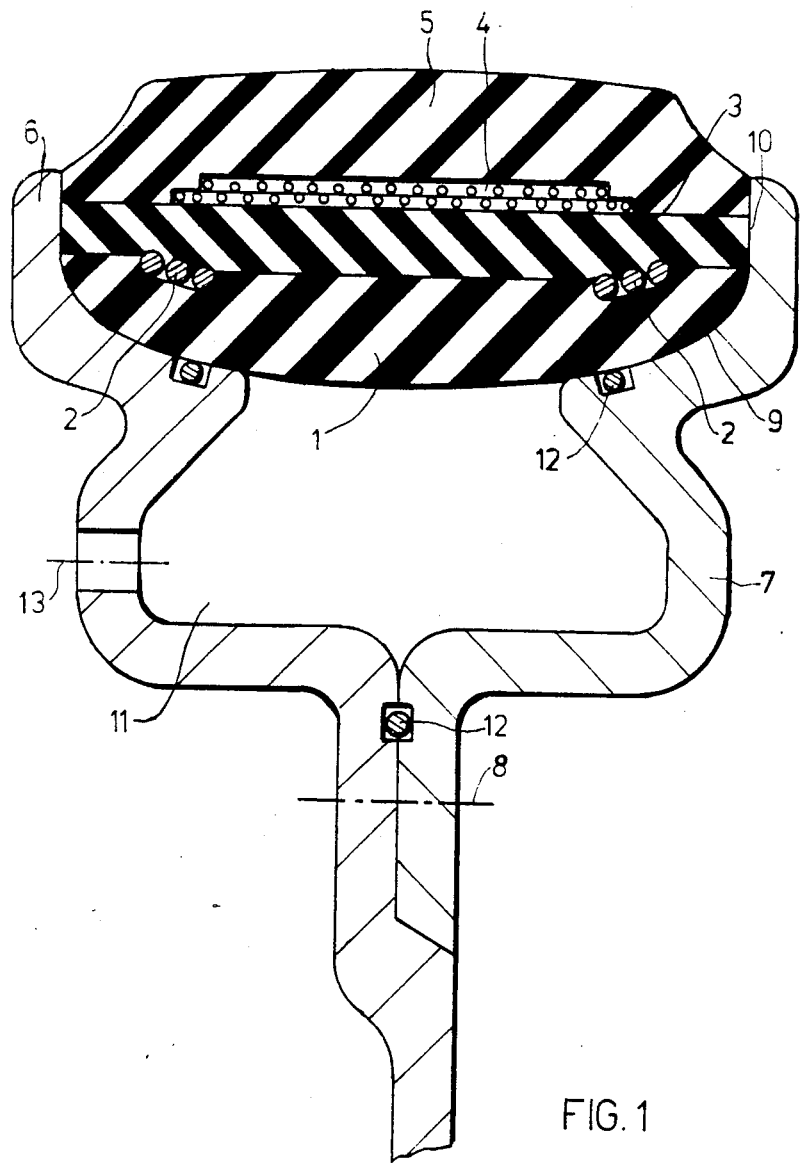

United States Patent [19]

Ippen et al.

[11] Patent Number: 4,573,510

[45] Date of Patent: Mar. 4, 1986

[54] TIRE FOR HEAVY LOADS

[75] Inventors: Jakob Ippen, Leverkusen; Friedel Stüttgen, Pulheim, both of Fed. Rep. of Germany

[73] Assignee: Bayer Aktiengesellschaft, Fed. Rep. of Germany

[21] Appl. No.: 282,498

[22] Filed: Jul. 13, 1981

Related U.S. Application Data

[63] Continuation of Ser. No. 97,534, Nov. 26, 1979, abandoned.

[30] Foreign Application Priority Data

Nov. 30, 1978 [DE] Fed. Rep. of Germany ....... 2851765

[51] Int. Cl.$^4$ .............................................. B60C 7/12

[52] U.S. Cl. .................................... 152/159; 152/302; 152/323; 152/9; 152/30; 152/47; 152/53; 301/97

[58] Field of Search ................ 152/155, 157, 158–166, 152/246, 302–303, 310, 315, 320, 322–323, 325, 327–329, 379.3, 379.4, 379.5, 7–9, 17, 30, 40–41, 47–52, 53, 345; 301/97–98

[56] References Cited

U.S. PATENT DOCUMENTS

| 1,491,537 | 4/1924 | Killen | 152/325 |
| 2,393,161 | 1/1946 | Haushalter | 152/325 |
| 4,108,228 | 8/1978 | Tiemann | 152/246 |

Primary Examiner—Lois E. Boland
Attorney, Agent, or Firm—Connolly and Hutz

[57] ABSTRACT

The tire for heavy load consists of a multi-layered flat ring held in the axial and radial direction by a two-part metal felloe and supported between the felloe by air.

2 Claims, 5 Drawing Figures

TIRE FOR HEAVY LOADS

CROSS-REFERENCE TO RELATED APPLICATION

This application is a continuation of application Ser. No. 97,534 filed Nov. 26, 1979, now abandoned.

This invention relates to a tire for heavy loads, consisting of a plurality of rubber layers with a breaker strip and wire cores on a metal felloe.

Attempts to equip modern short distance vehicles (cabin trains) with wheels consisting of a steel ring on which a rubber tread surface is vulcanised are already known.

When such tires were tested in trial runs, they were found to be unsuitable for heavy loads at high speeds because the rubber tread surface eventually became detached from the steel ring. Attempts to improve the bond between the tread surface and the ring by using different bonding agents or rubber mixtures have not so far produced the desired result.

Pneumatic tires fitted on steel felloes are also known.

High travel stroke produces a rough ride in rail vehicles, which reduces the passenger comfort. Furthermore, pneumatic tires require substantially more space for their installation, which is often not available.

It is an object of this invention to provide a tire for heavy loads which provides a low spring characteristic and will remain firmly anchored to a steel body under continuous operation even at high velocities.

According to the present invention, there is provided a tire for heavy loads, the tire comprising a ring member having a plurality of rubber layers, a breaker strip and wire cores and being in the form of a flat ring the width of which is at least twice the maximum height thereof, and wherein the ring member is held at the edges of the internal surface thereof in the radial and axial direction by a two-part metal felloe and is supported in the region intermediate said edges by air contained in a space enclosed by the internal surface of the ring member and the metal felloe.

Particular advantages achieved by the invention lie in the fact that a predetermined spring path can be obtained since the pressure, thrust and bending stresses can be determined in advance. Moreover, due to the air pressure acting from inside, the tire is securely held even under large stresses. Another advantage is that the tire has emergency characteristics under conditions of pressure loss. The particular construction of the tire allows for a simplified or even automatic production method.

In one particular embodiment, the breaker strip and the wire cores overlap at least partially in radial projection. This arrangement of breaker strip and wire cores ensures that the forces from the breaker strip will not fail to be transmitted to the felloes through the wire core.

According to a further embodiment, the radius of the tread surface is 100 to 200% of the width of the tire, preferably 150%.

The amount of rolling friction and hence heating up of the tire can be to a large extent influenced by the radius of the tread surface. The rounding off in this construction of tire provides for a certain pressure distribution of the counter forces transmitted from the ground.

In one embodiment, a circumferential seal is provided between and on the circumference of the divided felloe.

The seal enables the desired air pressure to be surely maintained within the air space in spite of inaccuracies in manufacture of the abutting surfaces of felloe to felloe and felloe to tire.

Figure 3:
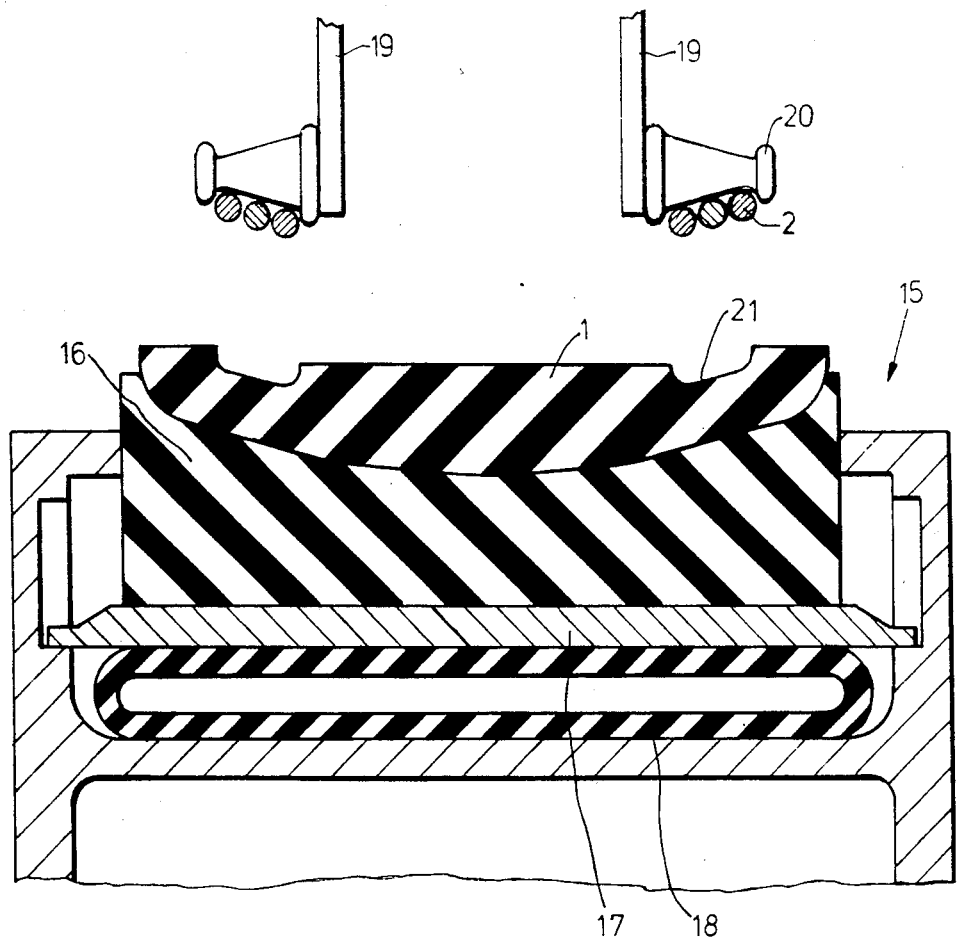
Figure 4:
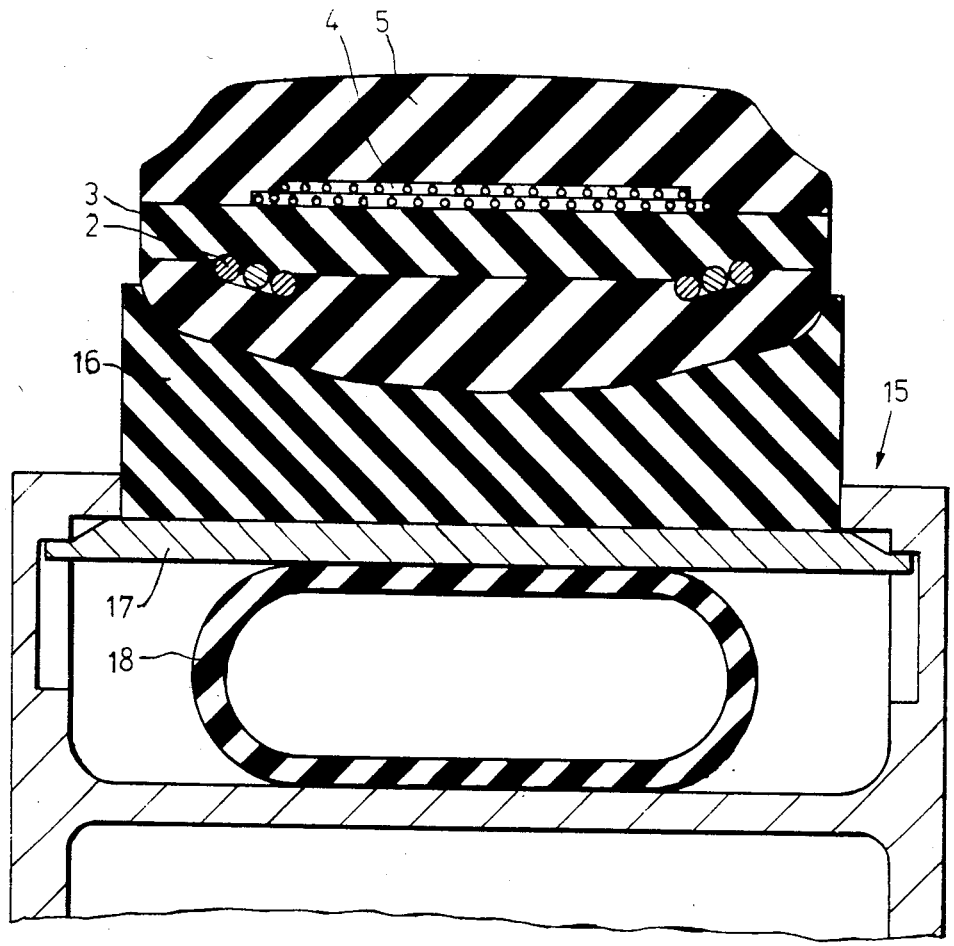
Figure 5:
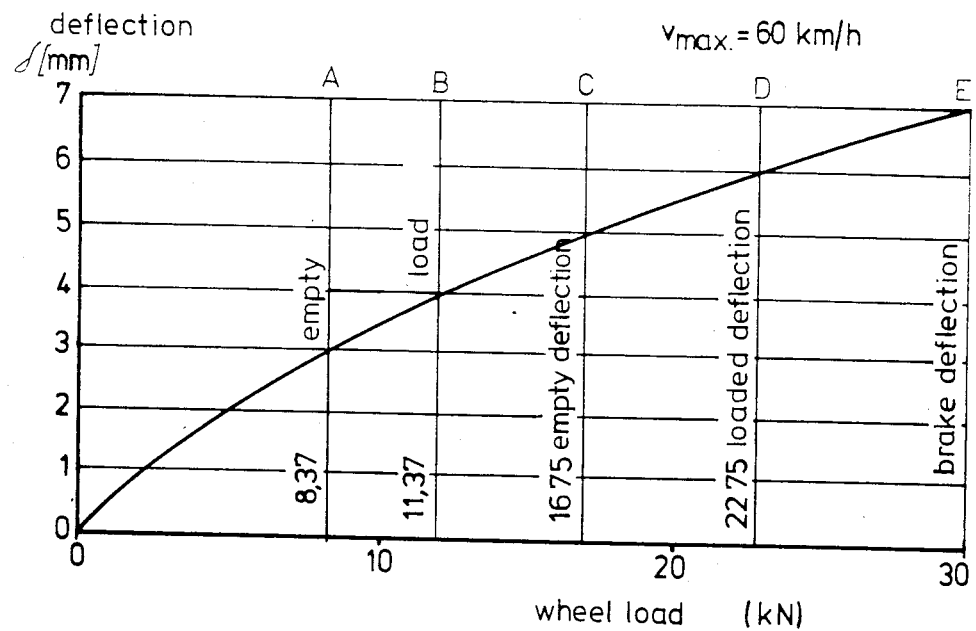

Embodiments of the invention are illustrated in the drawings by way of example and described in more detail below. In the drawings, FIG. 1 represents a section through a tire laterally guided at the edge, FIG. 2 represents a section through a felloe with an annular tire of equal width, FIG. 3 represents a section through a winding tool at the initial stages of manufacture, FIG. 4 represents a section through the winding tool after application of all the layers, and FIG. 5 shows the spring characteristic.

Figure 2:
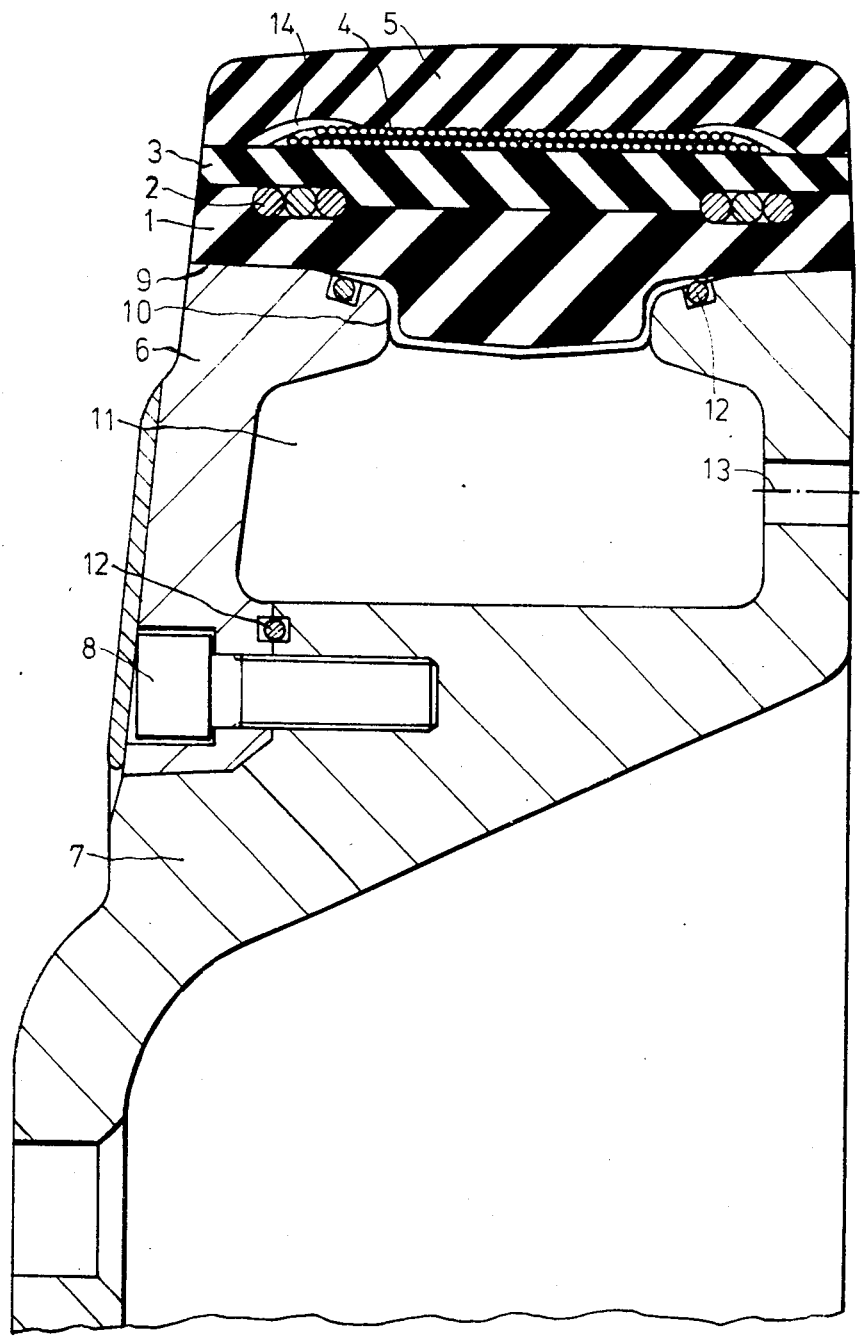

In FIGS. 1 and 2, an annular tire consisting of inner layer 1, wire cores 2, middle layer 3, breaker strip 4 and tread surface layer 5 is shown inside a felloe of two parts 6, 7 connected together by screws 8 which can be released for fitting the tire.

The annular tire rests on the circumferential surfaces 9 of the felloe and is prevented from shifting laterally by surfaces 9 or edges 10. An air space 11 is closed off from the outside by circumferential seals 12 and a valve 13.

FIG. 2 further shows a covering layer 14 over the edges of the breaker strip 4.

FIG. 3 represents the first stages in the process of manufacture of an annular tire. A rubber walled track 16 having the necessary internal contour of the tire is fitted on a simple expansion drum 15. The track 16 is supported on a segmented steel ring 17 which can be displaced radially outwards by expansion bellows 18. The internal tire layer 1 which may be preformed, e.g. by extrusion, is cut to the required length and then joined up to form a ring on the rubber sleeve 16.

Displaceable core holders 19 then shift a core holder 20 with wire cores over recess 21 in the inner layer 1.

In FIG. 4, expansion bellows 18 have been filled with air and have pushed the inner layer 1 against the wire core 2 by way of the steel ring 17 and rubber sleeve 16. The middle layer 3, strip 4 and tread surface 5 are then applied in succession and each layer is joined up at the ends to form a ring.

When the air is let out of the expansion bellows 18, the tire can be removed from the press and transferred to a heating press.

The graph in FIG. 5 represents a spring constant dependence with load which can be achieved with this tire.

The expressions in FIG. 5 mean spring deflection (mm) $v_{max}$ velocity (60 km/h):

A deflection of a tire loaded with own weight on straight-line track,

B deflection of a tire loaded with own weight and carrying capacity on straight-line track, C deflection of a tire loaded with own weight on a switch point of a track, D deflection of a tire loaded with own weight and carrying capacity on a switch point of a track, E deflection of a tire loaded with own weight and carrying capacity on a switch point of a track including braking.

The tires according to the invention may be manufactured from any natural or synthetic rubber which in the vulcanized state has a Shore A hardness of 55 to 90 and a tension of 110 to 210 kg/cm² at 3000% elongation. Natural rubber, styrene/butadiene, polybutadiene and ethylene/propylene terpolymer rubbers are particularly suitable.

We claim:

1. A tire for heavy loads, the tire comprising a metal felloe having a pair of sides opposing each other across an air space, a ring member having a plurality of rubber layers, a breaker strip and wire cores, the ring being a generally flat ring having a width and a maximum height of which the width is at least twice the maximum height, the flat ring having outer edges held by the opposing sides of the metal felloe, and wherein the ring member is supported intermediate said outer edges by air contained in the air space enclosed by the ring member and the metal felloe, and the breaker strip and wire cores at least partially overlapping in radial projection.

2. A tire according to claim 1, wherein the felloe has two parts, and a circumferential seal is provided between the circumference of the two-part felloe and the flat ring.

* * * * *